(12) United States Patent
Hilvers

(10) Patent No.: US 10,986,452 B1
(45) Date of Patent: Apr. 20, 2021

(54) HEARING AID MOUNTING ASSEMBLY

(71) Applicant: Richard Hilvers, Ft Jennings, OH (US)

(72) Inventor: Richard Hilvers, Ft Jennings, OH (US)

( * ) Notice: Subject to any disclaimer, the term of this patent is extended or adjusted under 35 U.S.C. 154(b) by 42 days.

(21) Appl. No.: 16/653,587

(22) Filed: Oct. 15, 2019

(51) Int. Cl.
*H04R 25/00* (2006.01)
*G02C 11/06* (2006.01)

(52) U.S. Cl.
CPC ............. *H04R 25/60* (2013.01); *G02C 11/06* (2013.01); *H04R 25/556* (2013.01); *H04R 25/65* (2013.01); *H04R 2225/0213* (2019.05)

(58) Field of Classification Search
CPC ...... H04R 25/60; H04R 25/556; H04R 25/65; H04R 2225/0213; G02C 11/06
See application file for complete search history.

(56) References Cited

U.S. PATENT DOCUMENTS

| | | | |
|---|---|---|---|
| 3,119,903 A | 1/1964 | Rosemond | |
| 5,533,130 A | 7/1996 | Staton | |
| 5,694,475 A * | 12/1997 | Boyden | H04R 1/1066 381/327 |
| 6,690,807 B1 | 2/2004 | Meye | |
| 7,103,192 B2 | 9/2006 | Bailey | |
| 7,735,996 B2 | 6/2010 | van der Zwan | |
| 8,011,783 B1 * | 9/2011 | LeBlang | G02C 3/006 351/158 |
| 8,848,959 B1 | 9/2014 | Richter | |
| 9,113,275 B2 | 8/2015 | Klem | |
| 2005/0074137 A1 * | 4/2005 | Bailey | G02C 11/06 381/322 |
| 2007/0248238 A1 * | 10/2007 | Abreu | G06F 1/163 381/381 |
| 2017/0102560 A1 | 4/2017 | Murphy | |
| 2019/0239006 A1 * | 8/2019 | Petersen | H04R 25/606 |

FOREIGN PATENT DOCUMENTS

WO WO0063741 10/2000

* cited by examiner

*Primary Examiner* — Tuan D Nguyen

(57) ABSTRACT

A hearing aid mounting assembly for retaining a hearing aid on a pair of eyeglasses includes a tube is slidable over an arm of a pair of eyeglasses. The tube is comprised of a heat shrinkable material such that the tube shrinks around the arm of the pair of eyeglasses when the tube is exposed to a heat source. A first mating member is attached to the tube and a second mating member is attached to a hearing aid. The second mating member releasably engages the first mating member. In this way the hearing aid is retained on the arm of the pair of eyeglasses thereby inhibiting the hearing aid from is lost.

6 Claims, 5 Drawing Sheets

HEARING AID MOUNTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mounting devices and more particularly pertains to a new mounting device for retaining a hearing aid on a pair of eyeglasses.

(2) Description of Related Art Including Information Disclosed Under 37 CFR 1.97 and 1.98

The prior art relates to mounting devices.

BRIEF SUMMARY OF THE INVENTION

An embodiment of the disclosure meets the needs presented above by generally comprising a tube is slidable over an arm of a pair of eyeglasses. The tube is comprised of a heat shrinkable material such that the tube shrinks around the arm of the pair of eyeglasses when the tube is exposed to a heat source. A first mating member is attached to the tube and a second mating member is attached to a hearing aid. The second mating member releasably engages the first mating member. In this way the hearing aid is retained on the arm of the pair of eyeglasses thereby inhibiting the hearing aid from is lost.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
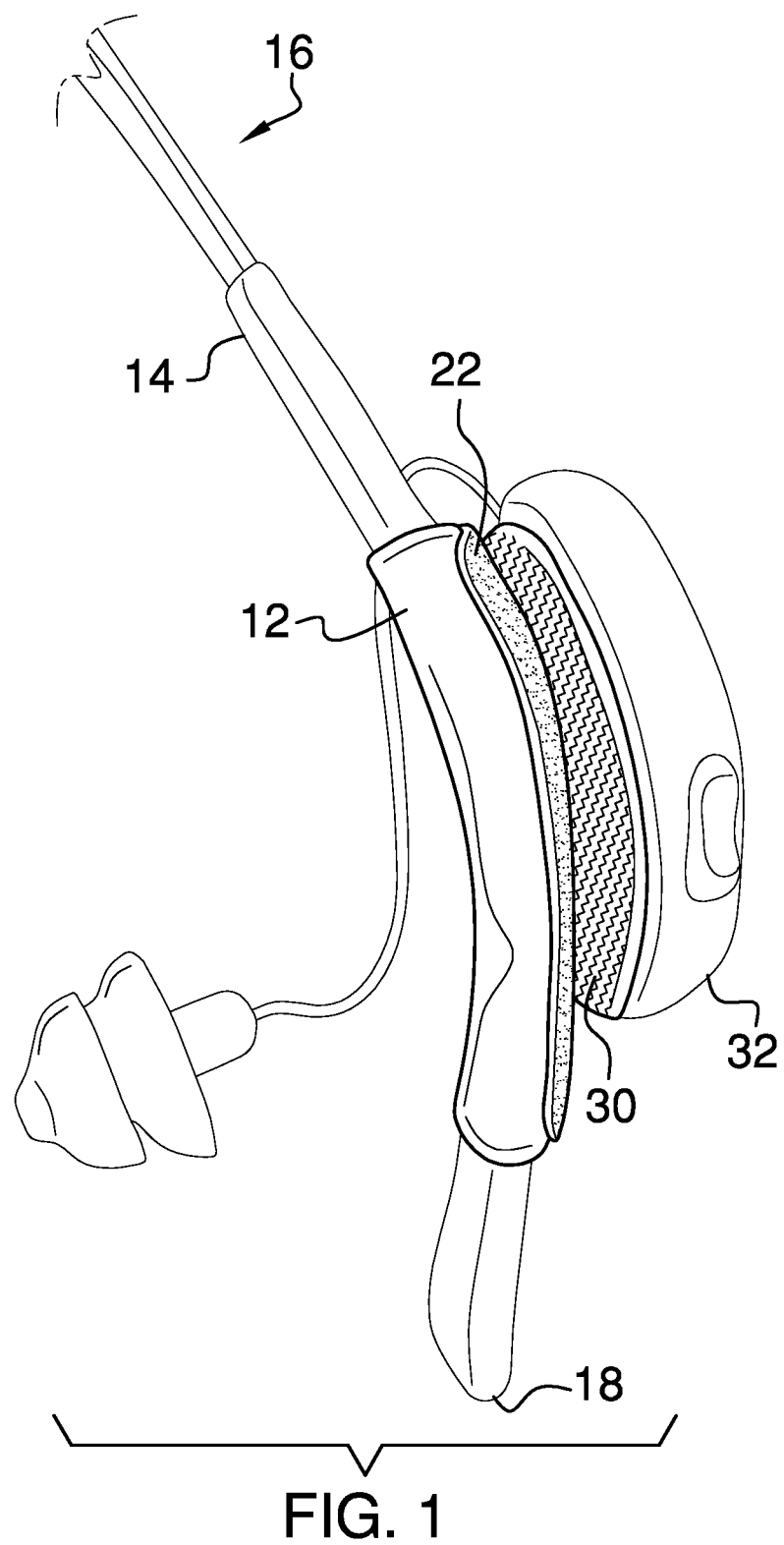
FIG. 1 is a perspective view of a hearing aid mounting assembly according to an embodiment of the disclosure.
Figure 2:
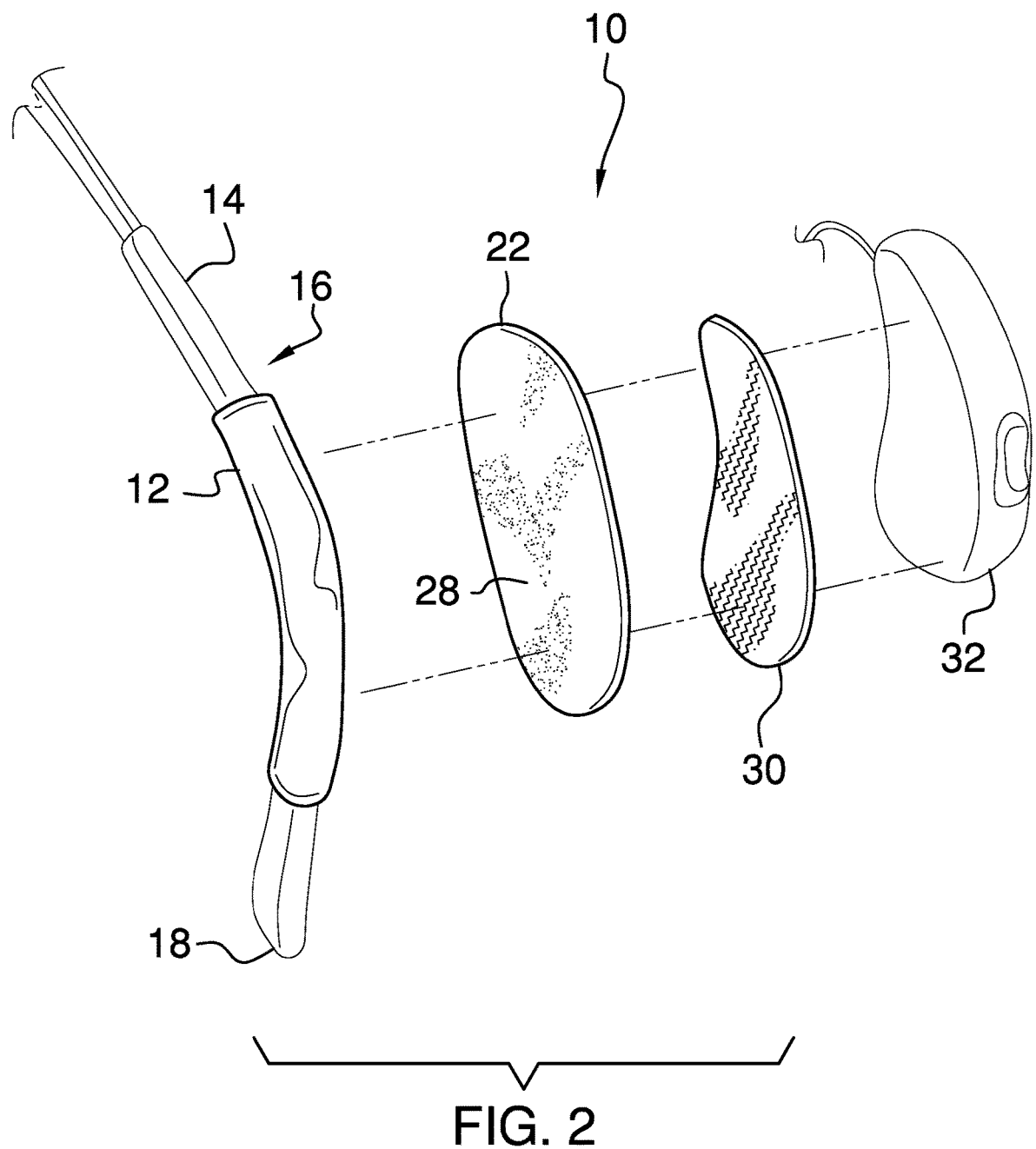
FIG. 2 is an exploded perspective view of an embodiment of the disclosure.
Figure 3:
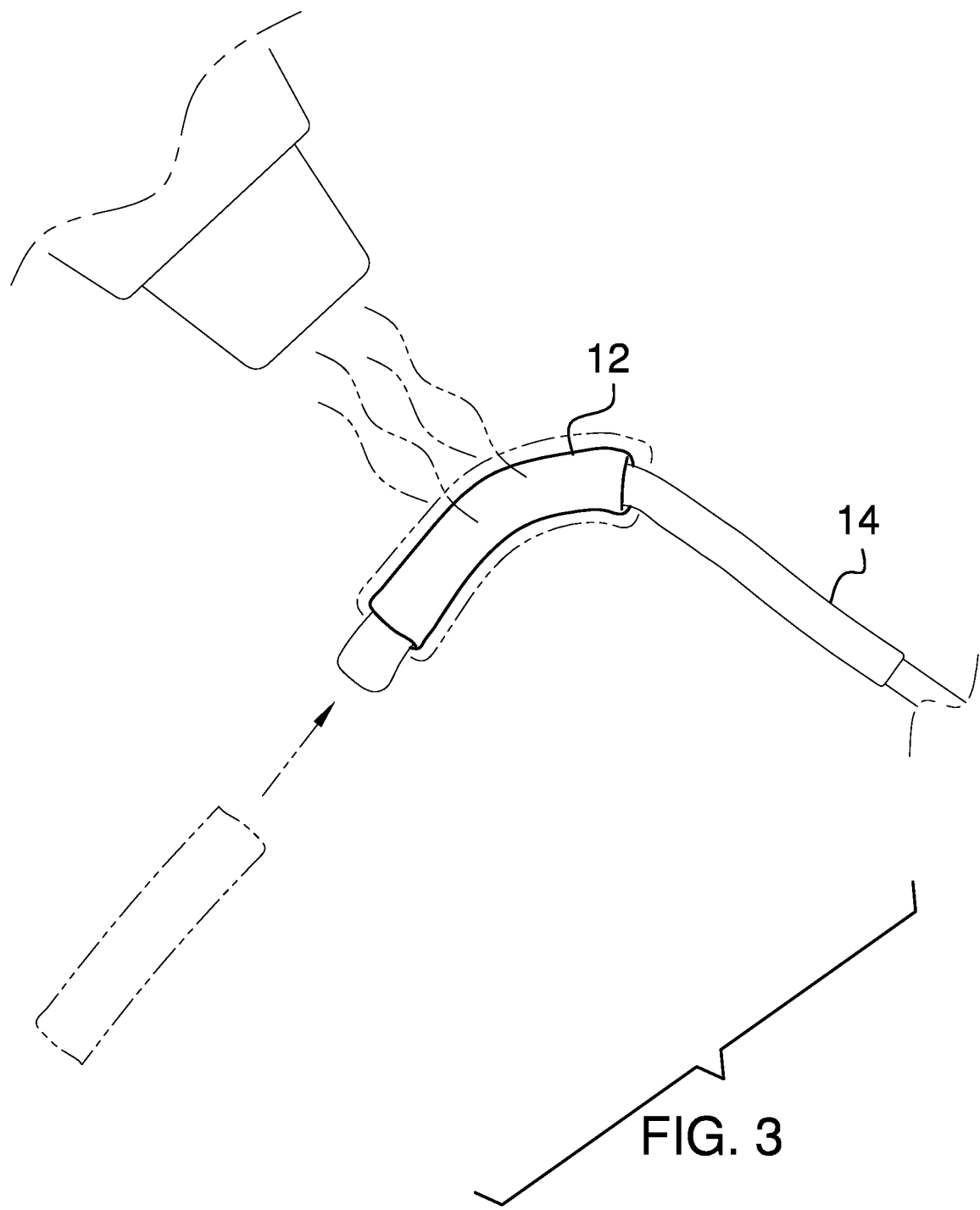
FIG. 3 is a perspective view of an embodiment of the disclosure showing a tube being exposed to a heat source for shrinking the tube.
Figure 4:
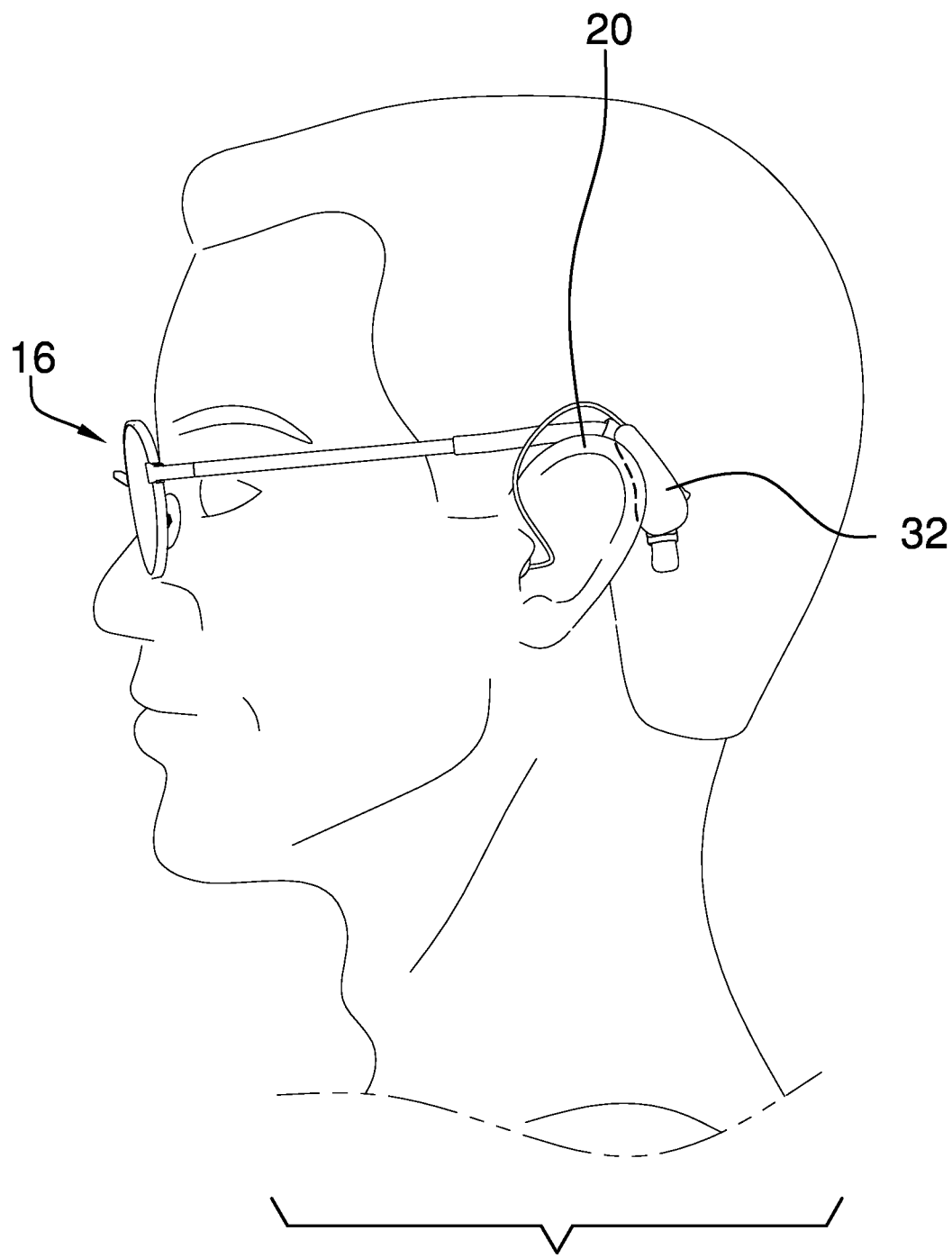
FIG. 4 is a perspective in-use view of an embodiment of the disclosure.
Figure 5:
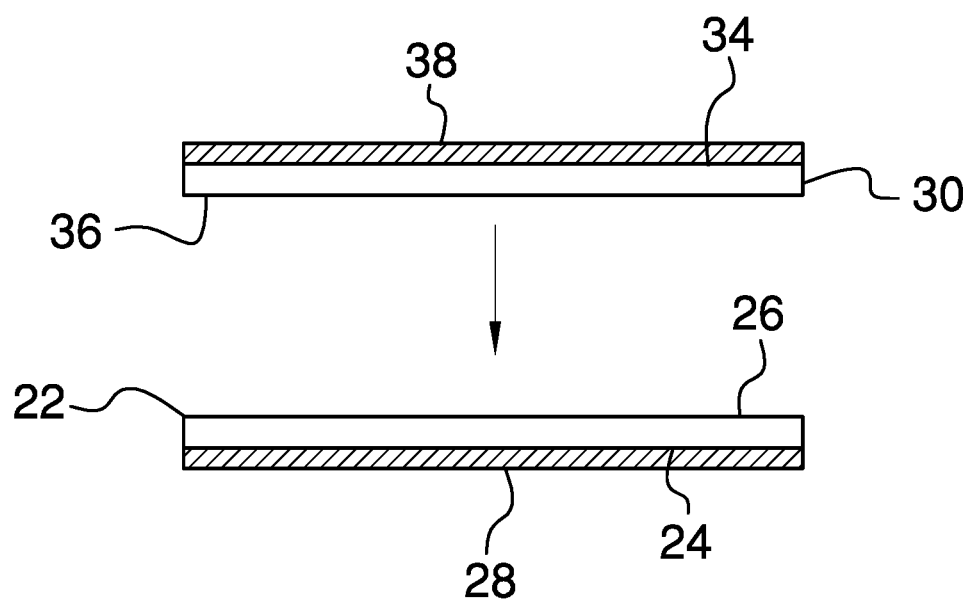
FIG. 5 is a front view of a first mating member and a second mating member of an embodiment of the disclosure.

With reference now to the drawings, and in particular to FIGS. 1 through 5 thereof, a new mounting device embodying the principles and concepts of an embodiment of the disclosure and generally designated by the reference numeral 10 will be described.

As best illustrated in FIGS. 1 through 5, the hearing aid mounting assembly 10 generally comprises a tube 12 that is slidable over an arm 14 of a pair of eyeglasses 16. The tube 12 is comprised of a heat shrinkable material such that the tube 12 shrinks around the arm 14 of the pair of eyeglasses 16 when the tube 12 is exposed to a heat source. In this way the tube 12 can be shrunken to engage and thusly remain motionless on the arm 14. The tube 12 may be positioned adjacent to an end 18 of the arm 14 such that the tube 12 is aligned with a user's ear 20 when the pair of eyeglasses 16 are worn.

A first mating member 22 is provided and the first mating member 22 is attached to the tube 12. The first mating member 22 has a first surface 24 and a second surface 26. Additionally, the first mating member 22 may comprise a hook and loop fastener or the like. The first mating member 22 may have an ovoid shape thereby facilitating the first mating member 22 to be wrapped around the tube 12.

A first adhesive layer 28 is provided and the first adhesive layer 28 is attached to the first mating member 22. The first adhesive layer 28 adhesively engages the tube 12 for retaining the first mating member 22 on the tube 12. Additionally, the first adhesive layer 28 is positioned on the first surface 24 of the first mating member 22 and the first adhesive layer 28 completely covers the first surface 24. The first mating member 22 is comprised of a deformable material thereby facilitating the first mating member 22 to be wrapped around the arm 14 of the pair of eyeglasses 16.

A second mating member 30 is provided and the second mating member 30 is attached to a hearing aid 32. The hearing aid 32 may be an electronic hearing aid, designed to be worn behind the ear 20, which includes a sound tube and an earpiece. The second mating member 30 releasably engages the first mating member 22 thereby facilitating the hearing aid 32 to be retained on the arm 14 of the pair of eyeglasses 16. In this way the hearing aid 32 is inhibited from falling off of the ear 20 and subsequently being lost. The second mating member 30 has a primary surface 34 and a secondary surface 36, and the secondary surface 36 releasably engages the second surface 26 of the first mating member 22. Additionally, the second mating member 30 may comprise a hook and loop fastener or the like.

A second adhesive layer 38 is attached to the second mating member 30. The second adhesive layer 38 adhesively engages the hearing aid 32 for retaining the second mating member 30 on the hearing aid 32. The second adhesive layer 38 is positioned on the primary surface 34 and the second adhesive layer 38 completely covering the primary surface 34.

In use, the tube 12 is slid around the arm 14 of the pair of eyeglasses 16 and the tube 12 is exposed to heat for shrinking the tube 12. The first mating member 22 is wrapped around the tube 12 such that the first adhesive layer 28 adheres to the tube 12. The second mating member 30 is positioned on the hearing aid 32 such that the second adhesive layer 38 adheres to the hearing aid 32. The second mating member 30 is pressed against the first mating member 22 to attach the hearing aid 32 to the arm 14 of the eyeglasses 16. In this way the hearing aid 32 is inhibited from being dropped and subsequently lost while the eyeglasses 16 are being worn.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A hearing aid mounting assembly being configured to removably mount a hearing aid to an arm of a pair of eyeglasses, said assembly comprising:
    a tube being slidable over an arm of a pair of eyeglasses, said tube being comprised of a heat shrinkable material such that said tube shrinks around the arm of the pair of eyeglasses when said tube is exposed to a heat source wherein said tube is configured to remain motionless on the arm;
    a first mating member being attached to said tube; and
    a second mating member being attached to a hearing aid, said second mating member releasably engaging said first mating member thereby facilitating the hearing aid to be retained on the arm of the pair of eyeglasses thereby inhibiting the hearing aid from being lost.

2. The assembly according to claim 1, wherein:
    said first mating member has a first surface and a second surface; and
    said assembly includes a first adhesive layer being attached to said first mating member, said first adhesive layer adhesively engaging said tube for retaining said first mating member on said tube.

3. The assembly according to claim 2, wherein said first adhesive layer is positioned on said first surface of said first mating member, said first adhesive layer completely covering said first surface, said first mating member being comprised of a deformable material thereby facilitating said first mating member to be wrapped around the arm of the pair of eyeglasses.

4. The assembly according to claim 1, wherein:
    said second mating member has a primary surface and a secondary surface, said secondary surface releasably engaging said second surface of said first mating member;
    said assembly includes a first adhesive layer; and
    said assembly includes a second adhesive layer being attached to said second mating member, said second adhesive layer adhesively engaging the hearing aid for retaining said second mating member on the hearing aid.

5. The assembly according to claim 4, wherein said second adhesive layer being positioned on said primary surface, said second adhesive layer completely covering said primary surface, said second mating member being comprised of a deformable material thereby facilitating said second mating member to conform to the shape of the hearing aid.

6. A hearing aid mounting assembly being configured to removably mount a hearing aid to an arm of a pair of eyeglasses, said assembly comprising:
    a tube being slidable over an arm of a pair of eyeglasses, said tube being comprised of a heat shrinkable material such that said tube shrinks around the arm of the pair of eyeglasses when said tube is exposed to a heat source wherein said tube is configured to remain motionless on the arm;
    a first mating member being attached to said tube, said first mating member having a first surface and a second surface;
    a first adhesive layer being attached to said first mating member, said first adhesive layer adhesively engaging said tube for retaining said first mating member on said tube, said first adhesive layer being positioned on said first surface of said first mating member, said first adhesive layer completely covering said first surface, said first mating member being comprised of a deformable material thereby facilitating said first mating member to be wrapped around the arm of the pair of eyeglasses;
    a second mating member being attached to a hearing aid, said second mating member releasably engaging said first mating member thereby facilitating the hearing aid to be retained on the arm of the pair of eyeglasses thereby inhibiting the hearing aid from being lost, said second mating member having a primary surface and a secondary surface, said secondary surface releasably engaging said second surface of said first mating member; and
    a second adhesive layer being attached to said second mating member, said second adhesive layer adhesively engaging the hearing aid for retaining said second mating member on the hearing aid, said second adhesive layer being positioned on said primary surface, said second adhesive layer completely covering said primary surface.

\* \* \* \* \*